United States Patent
Baumhof

(10) Patent No.: US 9,003,476 B2
(45) Date of Patent: *Apr. 7, 2015

(54) COMMUNICATIONS SECURITY SYSTEMS

(75) Inventor: Andreas Baumhof, Cronulla (AU)

(73) Assignee: Symbiotic Technologies Pty Ltd, Manly Vale (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/533,278

(22) Filed: Jun. 26, 2012

(65) Prior Publication Data

US 2013/0007838 A1    Jan. 3, 2013

Related U.S. Application Data

(63) Continuation of application No. 12/303,094, filed as application No. PCT/AU2007/000747 on May 29, 2007, now Pat. No. 8,234,687.

(30) Foreign Application Priority Data

May 29, 2006 (AU) ................................ 2006902878
Oct. 10, 2006 (AU) ................................ 2006905620

(51) Int. Cl.
G06F 21/00 (2013.01)
H04L 29/06 (2006.01)
G06F 21/60 (2013.01)

(52) U.S. Cl.
CPC .............. H04L 63/20 (2013.01); G06F 21/606 (2013.01)

(58) Field of Classification Search
CPC ..................... H04L 67/1012; H04L 29/08189
USPC ...................... 726/1–4, 22–30; 713/168–172; 709/223–225, 227–229

See application file for complete search history.

(56) References Cited

U.S. PATENT DOCUMENTS

| | | | |
|---|---|---|---|
| 5,925,126 A | 7/1999 | Hsieh | |
| 6,081,899 A * | 6/2000 | Byrd | 726/2 |
| 7,311,246 B2 * | 12/2007 | Arisawa | 235/379 |
| 7,370,008 B1 * | 5/2008 | Hill | 726/27 |
| 7,516,478 B2 | 4/2009 | Limont et al. | |

(Continued)

FOREIGN PATENT DOCUMENTS

| | | |
|---|---|---|
| EP | 1650633 A1 | 4/2006 |
| WO | WO-03/029941 A2 | 4/2003 |
| WO | WO-2006/038987 A2 | 4/2006 |

OTHER PUBLICATIONS

European Search Report dated Jun. 29, 2010.

(Continued)

*Primary Examiner* — Josnel Jeudy
(74) *Attorney, Agent, or Firm* — Novak Druce Connolly Bove + Quigg LLP

(57) ABSTRACT

A method of establishing secure communications between a first computer, eg a client computer, and a second computer, eg a web server, whereby the client computer receives one or more security policies relating to the web server. A client application examines the client computer and preferably configures one or more aspects of the client computer in order to make it comply with the security policies. Once the web server receives the results of this examination and/or configuration process, it can determine whether the secure communications are to be established and whether any restrictions need to be placed on this communication and/or the activity conducted via the communication.

16 Claims, 4 Drawing Sheets

(56) References Cited

U.S. PATENT DOCUMENTS

| | | | |
|---|---|---|---|
| 7,536,544 B2* | 5/2009 | Xiao | 713/158 |
| 7,735,100 B1 | 6/2010 | Sallam | |
| 2002/0120779 A1* | 8/2002 | Teeple et al. | 709/246 |
| 2002/0176611 A1 | 11/2002 | Dong | |
| 2003/0014525 A1* | 1/2003 | DeLima et al. | 709/227 |
| 2003/0014623 A1* | 1/2003 | Freed et al. | 713/150 |
| 2004/0049588 A1 | 3/2004 | Shinohara et al. | |
| 2004/0186620 A1 | 9/2004 | Chirnomas | |
| 2005/0060568 A1 | 3/2005 | Beresnevichiene et al. | |
| 2005/0086511 A1* | 4/2005 | Balacheff et al. | 713/200 |
| 2005/0120238 A1 | 6/2005 | Choi | |
| 2005/0246767 A1 | 11/2005 | Fazal et al. | |
| 2006/0101069 A1* | 5/2006 | Bell et al. | 707/103 R |
| 2007/0124803 A1 | 5/2007 | Taraz | |
| 2008/0267272 A1 | 10/2008 | Kulessa et al. | |

OTHER PUBLICATIONS

Canadian Office Action dated May 5, 2014.

International Search Report, PCT/AU2007/000747, mailed Sep. 5, 2007.

* cited by examiner

Figure 2

COMMUNICATIONS SECURITY SYSTEMS

CROSS-REFERENCE TO RELATED APPLICATIONS

This application is a continuation of U.S. patent application Ser. No. 12/303,094, filed Mar. 26, 2012, now U.S. Pat. No. 8,234,687, which is a national stage application under 35 USC §371(c) of PCT Application No. PCT/AU2007/000747, entitled "COMMUNICATIONS SECURITY SYSTEM," filed May 29, 2007, which claims priority from Australian Patent Application No. 2006902878, filed May 29, 2006 and Australian Patent Application No. 2006905620, filed Oct. 10, 2006 all of which are hereby incorporated by reference herein.

FIELD OF THE INVENTION

This invention relates generally to the field of establishing and maintaining secure connections over a network such as the Internet.

BACKGROUND OF THE INVENTION

The Internet enables people across the globe to buy and sell, and interact as never before. Internet activities however, whether involving email, personal information such as credit card details, visiting an e-commerce based website or logging into an online banking system, require effective security and encryption mechanisms to ensure personal data and sensitive information are safe from misappropriation and online fraud. Threats to this security include fraudulent attacks from third parties or programs such as computer viruses, worms, trojan horses and spyware which usually install themselves on a user's computer through deception, and are typically capable of accessing and compromising important data, affecting the performance of the computer and/or monitoring the activities of users.

One means of minimising the chances of damage caused by such threats is to completely isolate the computer from other computers and networks from which such threats may be received. Although this approach may significantly reduce the susceptibility of the computer to an attack or the chances of the computer becoming infected, such an action is clearly impractical for many users as they are severely restricted in their activities.

An alternative approach to dealing with such threats is to install a security firewall and/or antivirus software, which typically run in the background of an operating system, detecting and ideally removing any suspicious processes or software. While such security programs are capable of protecting a computer from the large proportion of threats, a computer will only continue to be protected from such threats if these programs are constantly updated to deal with new viruses and worms being developed everyday. Therefore, if a computer is not protected by effective security programs or these programs are not regularly updated, the computer is potentially left open to attacks from viruses or worms. As the abovementioned threats are typically passed from computer to computer, a compromised computer is not only an issue for its own users, but also users of other computers on the network, such as the Internet, to which the compromised computer may connect.

Another problem with conventional security programs and systems is that the user is left alone in his responsibility to keep the computer safe and infection free. Therefore, a user neglecting to properly protect against relevant threats may have his or her Internet activity monitored and personal information misappropriated. In situations where sensitive information such as bank or credit details are being transmitted, misappropriation of this information could lead to the fraudulent appropriation of funds from the user's financial accounts.

While early attempts at password protection have slowly evolved to more sophisticated systems, virtually all current password protection security systems on the Internet do not guard against fraudulent attacks such as phishing. One example of phishing is where an email is received, supposedly from the bank or institution a user deals with, which requests urgent verification of a user's details to avoid their account being suspended. Clicking on a link within the email typically forwards the user to a mock site which is made to look like the official site of the bank or institution the user is accustomed to and invites the user to enter their login and password. Once these details are in the possession of third parties, they may use the information to gain access to the user's financial accounts or other sensitive information.

These types of online fraud attacks undermine customer confidence and loyalty in an online service provider, the brand value of the bank or other institution, and the trust relationship as a whole in relation to activities and transactions conducted over the Internet.

The firewall and antivirus security programs discussed above are primarily directed at protecting user's from malicious attacks or programs on the computer or network system, rather than from phishing attacks where the dissemination of a user's information occurs via a website to which the user is misdirected by deception. Security applications that do deal with phishing attacks only manage to secure users from known phishing sites by adopting a black list approach. However, new phishing sites and malicious applications are identified everyday and until these threats are verified and placed on a black list, a user's computer is left vulnerable.

Accordingly, it is an object of the present invention to provide a means of securing communications across a network from security threats that may be present on the user's computer, or that may be transmitted from a compromised computer within a network.

It is a further object of the present invention to provide a means of protecting against security threats or websites to which the user is fraudulently directed.

Any discussion of documents, devices, acts or knowledge in this specification is included to explain the context of the invention. It should not be taken as an admission that any of the material formed part of the prior art base or the common general knowledge in the relevant art on or before the priority date of the claim herein.

SUMMARY OF THE INVENTION

Broadly, the invention allows secure communications to be established between two computers by ensuring that at least one of the communicating computers is aware of the configuration of the other before a determination is made that secure communications is allowed to be established. In this way, the decision of whether or not to establish secure communications is made with knowledge of whether there exist any threats and/or potential threats that may be affect the security of the communications. If the decision is made to establish secure communications, restrictions may be placed on the activity that can be conducted over the secure connections once established.

In one aspect, the present invention provides a method of establishing secure communications between a first computer and a second computer, the method including the steps of:

a) communicating to the first computer at least one security policy relating to the second computer;

b) initiating an examination process on the first computer in order to evaluate whether the first computer complies with the security policy;

c) the first computer communicating the results of the examination process to the second computer; and d) determining at least one aspect of the secure communications between the first computer and the second computer;

wherein the determination of at least one aspect of the secure communications between the first computer and second computer is based at least in part on the results of the examination process.

In another aspect, the present invention provides a computer program for establishing secure communications between a first computer and a second computer, said computer program including computer instruction code for executing tasks including:

a) communicating to the first computer at least one security policy relating to the second computer;

b) initiating an examination process on the first computer in order to evaluate whether the first computer complies with the security policy;

c) receiving the results of the examination process; and d) determining at least one aspect of the secure communications between the first computer and the second computer;

wherein the determination of at least one aspect of the secure communications between the first computer and second computer is based at least in part on the results of the examination process.

In yet another aspect, the present invention provides a computer programmed in accordance with the above method.

In yet another aspect, the present invention provides a computer system including a first computer and a second computer, each of the first computer and the second computer respectively programmed in accordance with the above method.

In one form, at least one of the computers may also be configured in accordance with certain requirements set out in a security policy so as to minimise any threats or potential threats that may affect the security of the communications.

It will be appreciated that the invention can be implemented in a manner where each communicating computer is both a first and second computer, thereby allowing each computer to be aware of the configuration of the other or ensure that the other meets certain requirements before secure communications are established.

The term computer is intended to be construed broadly and encompass any electronic device that stores, retrieves, and processes data, and can be programmed with instructions, including personal desktop computers, laptops and notebooks, handheld personal digital assistants (PDAs), workstations, servers, mainframes, etc. Accordingly, in one form, the invention may be implemented where one or both of these computers are servers.

The term list is intended to be construed broadly and include ordered or unordered listing of items, tables, databases and records, etc.

There has thus been outlined, rather broadly, the more important features of the invention in order that the detailed description of an embodiment thereof may be better understood, and in order that the present contribution to the art may be better appreciated.

BRIEF DESCRIPTION OF THE DRAWINGS

Preferred embodiments of the present invention will be described with reference to the accompanying drawing, in which:

FIG. 2 is a screenshot of one form of the policy generator application of the implementation in FIG. 1;

DETAILED DESCRIPTION OF PREFERRED EMBODIMENTS

The present invention is not specific to any particular hardware or software implementation, and is at a conceptual level above specifics of implementation. It is to be understood that various other embodiments and variations of the invention may be produced without departing from the spirit or scope of the invention. The following is provided to assist in understanding the practical implementation of particular embodiments of the invention.

Figure 1:
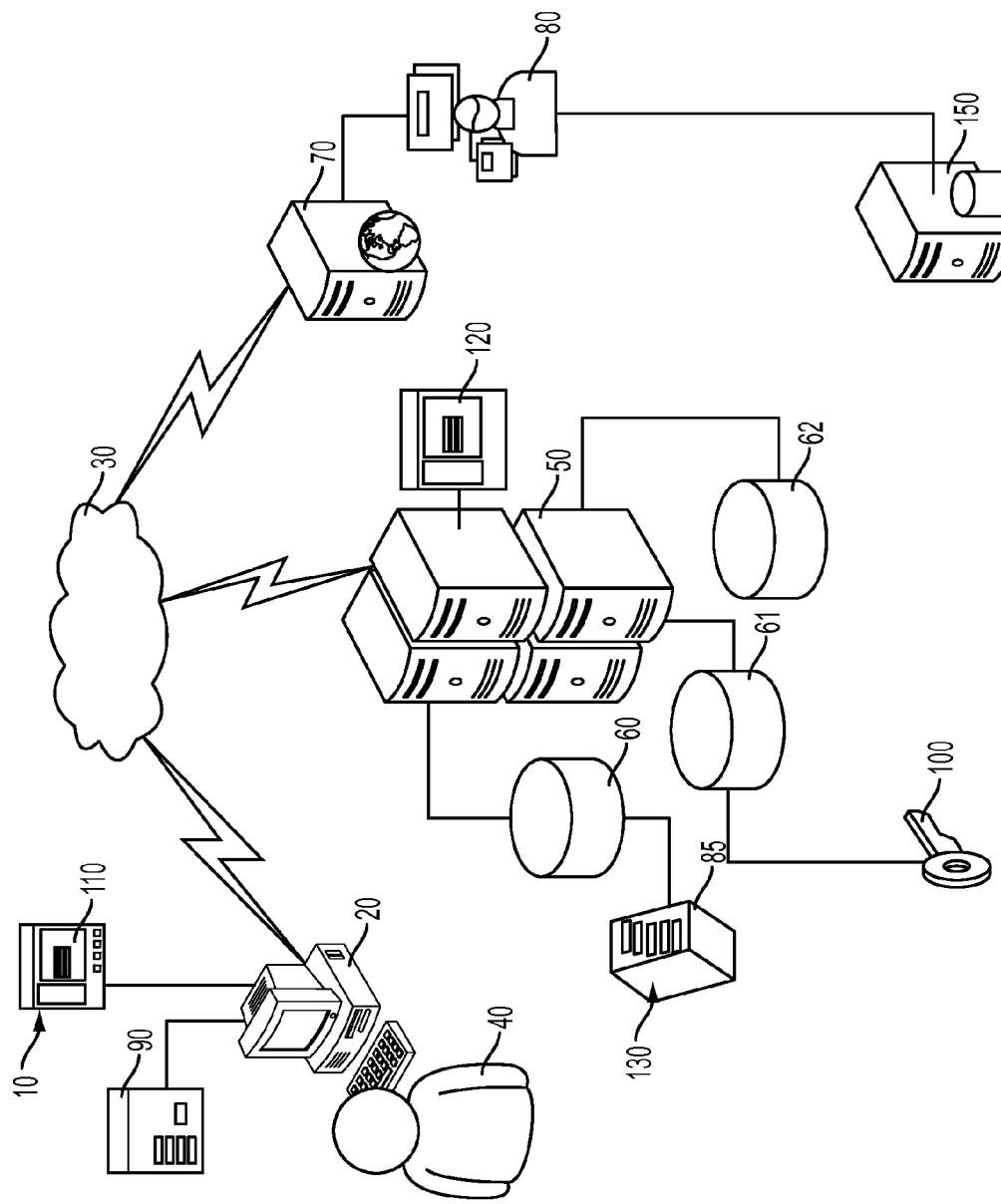
FIG. 1 is a schematic illustration in overview of the components of an implementation of the invention.

FIG. 1 shows a security system 200, which includes a client application 10 installed on a client computer 20 which is used by a user to conduct online activity over a network 30 such as the Internet involving a system server 50. The client application 10 regulates security aspects of the client computer 20 during a transaction that is about to happen with a server and the activities undertaken by user 40 when using the client computer 20. The client application 10 may also communicate with the system server 50 to secure a particular activity, by accessing the policy database 60, the community database 61 and/or the program database 62, each of which contain information relevant to the security of the client computer 20.

Whilst the present implementation is described in relation to the Internet, it will be appreciated that the present invention may be applied to any networked or other communications arrangement, with appropriate modifications.

It will also be appreciated that while the policy database 60, the community database 61 and the program database 62 have been described as three distinct databases, each of these databases may be a different aspect of a single central or distributed database. Also, it is preferable that at least some of the data stored in these databases is mirrored locally on the client computer 20 for ease of reference.

The system 200 protects the user 40 against attacks such as phishing by allowing the client application 10 and/or the user 40 to identify, for example, the web server 70 to which they are trying to connect, and determine whether or not the web server 70 is authentic. If it is found that the web server 70 is not authentic, for example it may have been setup in an attempt at phishing, the connection is refused and the user 40 is informed. If the web server is found to be authentic, the client application 10 facilitates the connection to the web server 70 to carry out the required activities. During the connection process, and once a connection is established, all out-going data submissions are supervised by the client application 10. Furthermore, if the web server 70 belongs to a web service provider 80, such as an online bank which is a subscriber to system 200, the web server 70 may require that client application 10 initiate a configuration process on the client computer 20 to ensure that this computer adheres to certain security policies 85 and/or is secured in lockdown mode. These restrictions will minimise the chances of the activities being compromised or the transmitted data being misappropriated by third parties. In order to determine which connections are to be allowed and which are not, and to determine which security policies 85 apply or which applications 90 are able to run during lockdown mode, reference is made to the policy database 60, the community database 61 and the program database 62. Alternatively, web server 70 may simply require an examination of client computer 20 be conducted and that information relating to the configuration of client computer 20 be communicated to web server 70 so that it can determine whether the communications should proceed. Further details in relation to each of these aspects of the system 200 are included below.

It will be appreciated, however, that while the below embodiments are discussed in the context of communications between a client computer 20 and a web server 70, other embodiments of the invention may be applicable in regulating the security of communications between two or more client computers, whereby in one form, the security policies 85 of these computers are uploaded to the policy database 60 or exchanged during the handshake process, or in another form, where the security policies are exchanged directly between the client computers during the handshake process.

Identification

One aspect of the system 200 is identifying a server such as the web server 70 with web fingerprinting. During this process, a unique web fingerprint 100 is generated by the client application 10 for each communication request in order to identify the authenticity of the web server 70 or other server, (e.g. a bank website allowing financial transactions). For HTTP requests, or more generally, for non-SSL requests, the SHA-1 fingerprint 100 of the requested URL (without the HTTP parameters) is used to identify the web server 70. SHA-1 is a cryptographic hash function belonging to the SHA (Secure Hash Algorithm) family. For SSL requests, it will be appreciated that fingerprint 100 of the certificate is used in addition to the above fingerprint calculation. It will be appreciated that this is a high security attribute which is not forgeable. Of course, alternative hashing algorithms or other fingerprint generating approaches could be used.

In operation, the web server 70 will present a digital certificate during the SSL-handshake and based on the SHA-1 (or similar hashing functions like SHA-256) fingerprint 100, the web server 70 can be identified. It will be appreciated that the SSL certificate fingerprinting is not the only way to identify a web server 70 and that there could be other attributes used in the authentication process like the IP address, URL or other suitable protocol.

The identification of the web server 70 is displayed to user 40, preferably using a non-forgeable browser-independent window 110. For all outgoing data submissions, the system calculates the web fingerprint 100 for each web request and checks the authenticity of the web server 70 by comparing this unique fingerprint 100 to those already stored in the community database 61. The community database 61 contains web fingerprints which have already been authenticated by user 40 or other users of the system 200. If the web fingerprint 100 matches one of these already authenticated web fingerprints, the web server 70 is authenticated and the connection is allowed to proceed.

If the web fingerprint 100 does not match one of these already authenticated web fingerprints, the client application 10 prompts user 40 to confirm whether the connection to web server 70 should be allowed to proceed and whether web server 70 should be identified as being authentic. In order to assist user 40 is making this decision, client application 10 may display details such as the IP address, server location, etc. of web server 70 in the browser-independent window 110. Furthermore, once the user 40 has indicated that the web server 70 is authentic, the client application 10 will relay this information to the system server 50 which will then create an entry in the community database 61 for reference by other users attempting to connect to web server 70. Preferably, this information is also stored locally by the client application 10 so that when the user 40 attempts to connect to the web server 70 at a later time, the web fingerprint 100 is simply compared to the local data maintained by the client application 10 and subsequently authenticated.

The operation of this method of identification is further described using the following example. An online business such as an online bank provides the client application 10 with details of a web server 70, such as hostnames/URLs, SSL certificate fingerprints and/or IP addresses/ranges. Based on this information, the client application generates a unique web fingerprint 100 which, once authenticated and stored by the client application 10, can be used in future transactions along with a typical login and password system to identify the web server 70 and establish a secure connection.

In one embodiment, the client application 10 may also generate a unique web fingerprint 100 for the client computer 20 which is then transmitted to the web server 70 in order to identify the client computer 20 to the web server 70.

In circumstances where the web server 70 is owned by a web service provider 80, who is a subscriber to system 200, the client application may alternatively identify web server 70 by reference to the policy database 60 without the need to compare fingerprints.

Guaranteed Authentication Program (GAP)

The Guaranteed Authentication Program (GAP) mode is part of the system 200 where once the web service provider 80 has been identified as a subscriber of the system 200, it allows security policies 85 to be applied to the client computer 20 and in some cases, the secure lockdown of the client computer 20 as described later.

As the client application 10 supervises all outgoing connections, it will automatically enable the GAP mode if it detects a connection between a client computer 20 having the client application and a web service provider 80 who is a subscriber of the system 200, ie a GAP participant. Once activated, the client application 10 shows a non-forgeable browser-independent window 110 with the image and name of the connected web service provider 80. The GAP mode also incorporates the IP address and SSL certificate fingerprints 100 and it is therefore not vulnerable to any DNS spoofing, man-in-the-middle or other pharming attacks, ie hacker's attack aiming to redirect a website's traffic to another (bogus) website.

The web service provider 80 (e.g. bank) uses a policy generator application 120, which may be an application installed on the web service provider's internal systems or a web applet installed on the system server 50, or any other suitable location, to generate an XML file 130 consisting of information such as allowed URL's, certificate fingerprints 100, IP addresses, name, description, bitmap and the hashing-server URLs, as well as the hashing server SSL fingerprints and relevant security policies 85. The XML file 130 is signed using a SHA-256 (which is another cryptographic hash function of the Secure Hash Algorithm family) hash value and then incorporated into the policy database 60 and accessed by the users of the system 200 as required.

For increased security, the hash value of XML file 130 may additionally be sent to a separate Internet update server, such as the GAP hash server (not shown), which is preferably hosted in a secure environment with government certification. Alternatively, where the web service provider 80 chooses to use its own or a third party hashing server 150, the SHA-256 hash is available via HTTPS.

In this case, during initialization of the GAP mode, the client application 10 calculates the hash of the XML file 130 and compares this hash to the value it retrieves either from the secure GAP server (this is done on top of the consistency check of the local settings, which prevents that any settings can be altered by an unknown source like spyware or virus), or from the hashing server 150 specified in the XML file 130.

The Secure Lockdown

Once the GAP mode described in the previous section is enabled, the client application 10 may configure the client computer 20 in accordance with the security policies 85 predefined by the web service provider 80, which may involve the initiation of the "lock down" process. It is to be understood that the "lock down" may be insisted on by the web service provider 80 so that it can pro-actively make sure that only "safe" computers, i.e. those that comply with the security policies 85 are granted access to their systems to conduct online activity.

In an alternative embodiment, the client application 10 may examine the client computer 20 and simply notify the user 40 and/or the web service provider 80 that the client computer 20 does not comply with the security policies 85 but not at that point configure the client computer 20 or restrict the online activities of the user 40.

If the lock down mode is enabled by the security policies 85, the client application 10 will automatically check all processes running on the client computer 20. A web service provider 80 can therefore make sure the client computer 20 is safe before any activity takes place.

In secure lock down mode, the client application refers to the program database 62 which stores information relating to known and common processes, and is continually updated by the administrators of the system 200. If an unknown process is detected by the client application 10, the user 40 and/or web server 70 are warned that there is an unknown process running on the client computer 20. To make sure that only known and "good" software is running, all unknown processes are marked as potentially malicious and the user 40 is then given the choice to close the corresponding programs 90, to let the client application 10 try to close programs 90 by terminating relevant processes or to proceed without closing the programs 90. However, the result of this decision is submitted to the web service provider 80 and based on the preconfigured security policies 85 of the web server 70, the user 40 may not be able to proceed with the connection if the security policy 85 has not been complied with. One example of such a situation is if malicious programs 90 or processes are running on the client computer 20 and cannot be stopped by client application 10. Alternatively, the user 40 may be allowed to proceed only with certain activities or may have restrictions placed these activities. One example of this is where user 40 is restricted from conducting banking transactions for amounts greater than $1000.

Security Policies

Some examples of the different types of security policies 85 are detailed below:

Access Control

The Access control policies indicate which users are allowed to request and access an online service. The process of identification as discussed above may also form part of these policies.

Trust Policies

The trust policies define exactly which components have to be trusted in order to complete the online activity. These can include Hostnames, SSL Certificates, but can also be applied to the other sections and can include the identity or Internet access policies like Geo-IP.

System Policies

The system policies regulate user activity based on the overall connection topology and can apply different restrictions, for example, if user 40 has VPN access to web server 70.

Network Policies

The network policies define who/when/what user/software is allowed to request either the Internet or a specific service. This policy can include, for example, a sophisticated personal firewall blocking Internet requests to non-related sites only during an online activity.

Figure 2:
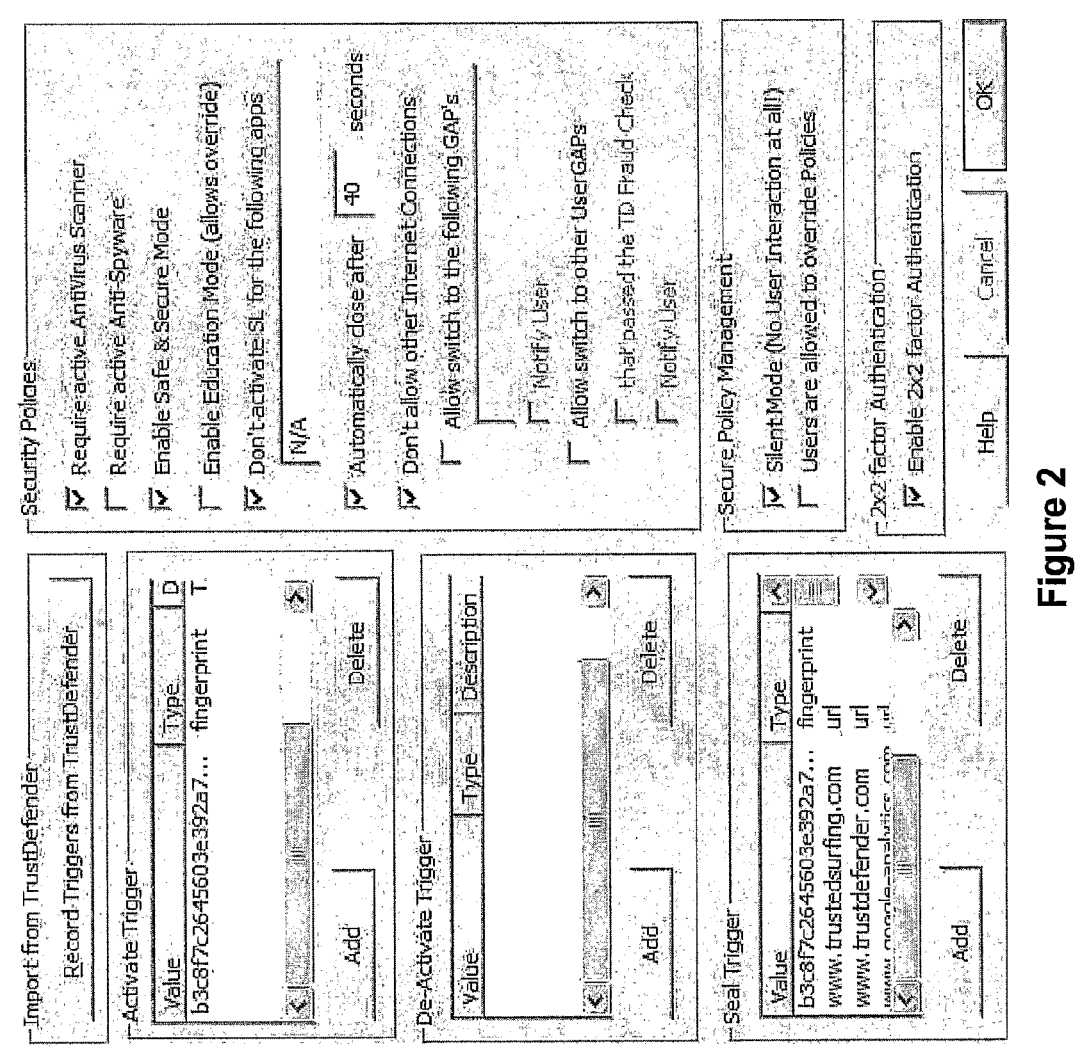

The GAP participants can define the security policies 85 using the policy generator application 120 as discussed above. A screenshot of one form of the policy generator application 120 is illustrated at FIG. 2.

The behaviour of the client application 10 in relation to a particular web server 70 and/or web service provider 80, and all the corresponding options relating to the policy database 60, the lockdown mode and other aspects and components can be configured with the security policies 85 configuration processes provided by the policy generator application 120.

An example of a workflow for the secure generation and storage of security policies is as follows:

The security policy 85 is defined by the web service provider 80 using policy generator application 120, The security policy 85 is saved to the XML file 130 (e.g. customer.xml), The hash value of XML file 130 is generated and noted by the web service provider 80, The XML file 130 is securely uploaded to system server 50, An email with the hash value and unique ID generated on the system server 50 is forwarded to the web service provider 80, If the web service provider's 80 noted hash value matches the hash value in the email, the security policy 85 is approved in a reply email, Once the system server 50 receives the approval, the policy 85 is stored in the policy database 60 and is able to be accessed by the users of the system 200 as required.

Examples of some specific security policies 85 that can be implemented in system 200 include:

Report back This policy prevents a secure connection being established until the web server 70 is informed of the configuration of client computer 20.

Don't allow other TCP/IP Connections. This policy prevents any concurrent internet connections not belonging to the web service provider 80 and therefore restricts the submission of any information to any other servers once the activity is taking place. This policy is directed at preventing any phishing attempts using bogus versions of the site.

Limit browser windows to x. This policy limits the number of open internet browser windows to the preconfigured number. This policy is directed at preventing any pop-up windows or other unnecessary windows that might possibly be malicious.

Require up-to-date antivirus scanner This policy only allows the client computer 20 to proceed in the secure lockdown mode, if an up-to-date antivirus scanner is found on the client computer 20.

Only allow the following process groups This policy follows a 'white list' approach to limit the processes running on the client computer 20 to those pre-approved on the program database 62, in order to minimise the chances of a malicious process running on the client computer 20. It will be appreciated that such an approach is directed at stopping any spyware/malware or other unwanted applications 90 (e.g. instant messaging applications) from running during the online activity. Preferably, this policy will simply initiate the lock down process which will then make reference to program database 62 to determine which process groups are allowed.

Disallow the following process program groups This policy follows a 'blacklist' approach and checks for running processes or programs 90 which are known to cause problems or to compromise internet security. If such programs 90 are found on the client computer 20, they are terminated before online activity is allowed. Preferably, this policy will simply initiate the lock down process which will then make reference to program database 62 to determine which process groups are not allowed.

It will be appreciated that numerous other security policies to regulate various aspects of the relevant computer systems, network connections, activities undertaken or any other suitable aspect of the session may be generated and implemented, and are encompassed within the concept of a security policy. It will also be appreciated that a web service provider 80 can change their security policy 85 settings at anytime, and the new settings are applied to all the system 200 users when they connect to a web server owned by the web service provider 80. Furthermore, the web service provider 80 may either apply common security policies across all web servers under its control or different security policies to different or specific web servers.

In alternate embodiments, the transmission of the security policies 85 to client application 10 may occur during a handshake type scenario dynamically with the web server 70, or by using an already deployed database from a trusted third party.

Policy Enforcement

The policy enforcer aspect of the client application 10 will enforce the security policies 85 on client computer 20. In order to further secure communications with the web server 70, the client application 10 may turn the result of the security policy 85 examination process into action. The client application 10 accepts the security policy 85 list as input and cycles through all security policies 85 that are non-compliant, and either allow or deny a specific process, application or connection, which may include a warning before acting.

Each security policy 85 can have different policy enforcement statuses such as warn, allow, deny. The client application 10 cycles through the list of security policies 85 gathered from the policy database 60 and for all security policies 85 that the client computer 20 does not comply to, takes the appropriate action. For example, all non-compliant attributes with the policy enforcement status of warn are allowed by the client application 10 but the user 40 is required to accept and acknowledge that the client computer 20 does not comply. The allow and deny enforcement statuses either allow or deny the communication if non-compliant attributes are found by the client application 10. It will be appreciated that all the policy enforcement statuses can be used in conjunction, for example, warn and deny and that furthermore, the policy enforcement types are an extensible list and not limited to the specific enforcement types stated above.

The evaluation of how and whether the client computer 20 complies with a particular security policy may be in the form of binary yes/no attributes, but are not limited in this manner and could also involve a percentage threshold, for example. Preferably, this evaluation is communicated to the web server 70.

Community Database

In the situation where web server 70 does not belong to a web service provider 80 who is a subscriber to the system 200, a determination as to whether the web server 70 should be accessible by users needs to made. In order to do this, the client application 10 refers to the community database 61 as described above under the heading Identification. Further aspects of the community database 61 are now described.

The information in the community database 61 is updated by users of the system 200 and therefore provides a continually updated resource containing all the information the client application 10 needs to evaluate whether a particular site, certificate, application or process should be trusted by users of the system 200. In some cases, this information may be automatically updated to the community database 61 by each user's client application 10 on a periodic basis or at some other suitable time.

Examples of the type of information available in the community database 61 include:

Known Since This field tells the user 40 whether the web fingerprint 100 of the web server 70 has a longstanding history or not.

Verified by the System This field indicates whether the relevant URL is part of a black list from a third-party vendor like Netcraft or Microsoft.

Pharming Check This check verifies whether the IP address being connected to actually belongs to the organisation that has registered the domain.

Average User Rating This field provides a score from 1 to 5 stars with a "subjective" classification from an author.

User Reviews Includes user reviews of the web server 70 or web service provider 80 where any user can write a review, but a valid email address is required. The reviews may also be moderated by administrators of the system 200.

How did Other System Users Decide This field indicates the actions other users of the system 200 have taken in respect of this particular web server 70 or web service provider 80.

It will be appreciated that this user community based approach of the system 200 will provide inexperienced users of the system 200 with a means to leverage the knowledge of a large internet community and take this into consideration before deciding whether the user 40 should trust, for example, the web server 70 or not.

In one embodiment, the system 200 includes a feature called "community autotrust" where the client application 10 automatically enables or disables access to web servers that are verified in the community database 61. The autotrust feature may take any of the following attributes into account in reaching a determination:

Known since

Verified by

Actions of the other system users

For example, the web server 70 is automatically trusted by client application 10 if the associated web fingerprint 100 is known for more than 3 days in the user community, is verified by a third party (by means of a white list) and/or at least 90% of the other system 200 users have already trusted the site hosted by the web server 70.

On the other hand, an example of a web server 70 that would automatically be blocked is with a web server with a web fingerprint 100 which is known for less than 3 days or appears on a third party blacklist.

It will be appreciated that other criteria or different values for the criteria discussed above or any combination thereof, can be applied in the determination of whether or not a particular web server 70 or web service provider 80 is to be trusted.

In the situation where a user 40 has accessed their online bank successfully before and now the client application 10 calculates a different web fingerprint 100, the client application 10 will check the web fingerprint 100 with the community database 61 and based on the knowledge of the community, will automatically block the connection to the web server 70 in circumstances where this is an already known attack, or if the web fingerprint 130 is known less than 3 days. The user 40 may in some circumstances be able to override this determination.

Handshake between Client Application and Server

Figure 3:
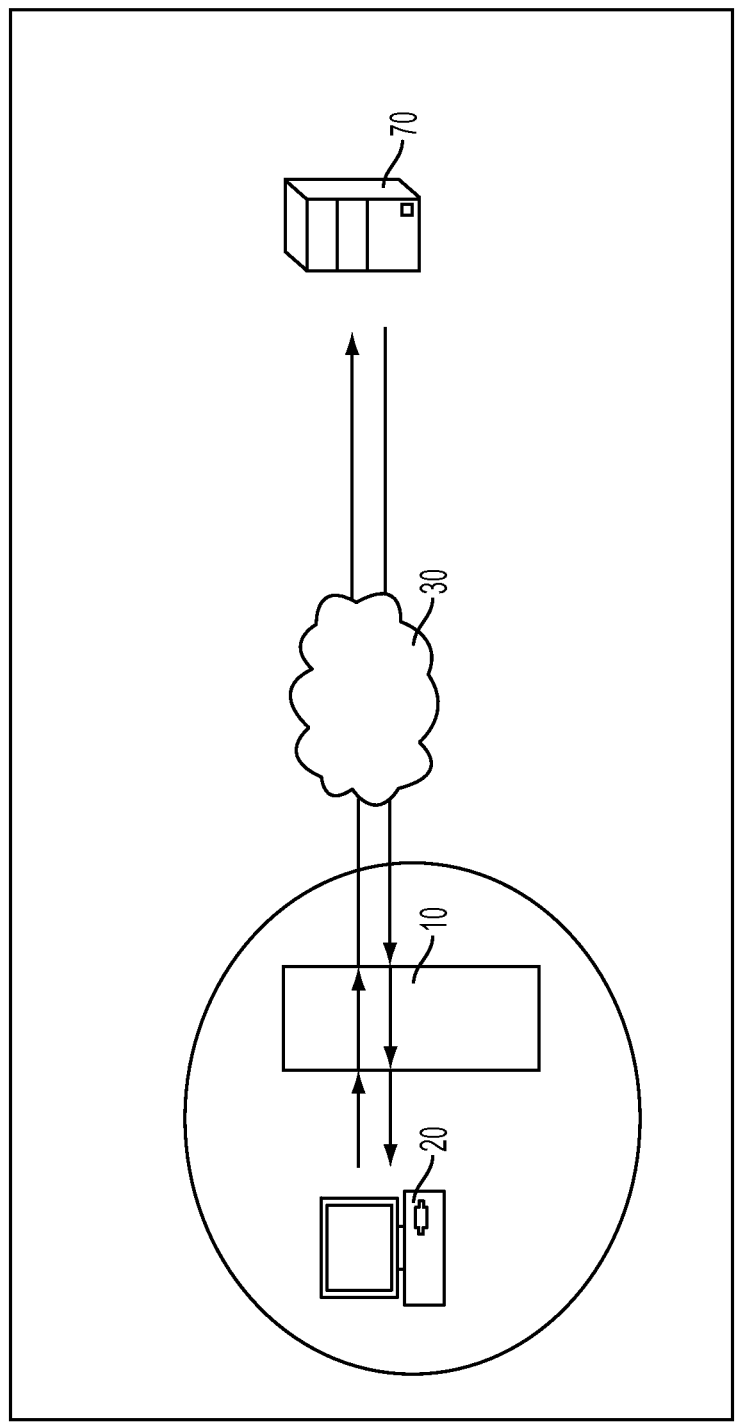
FIG. 3 is context diagram illustrating the handshake process between client application and the server in the implementation in FIG. 1.
Figure 4:
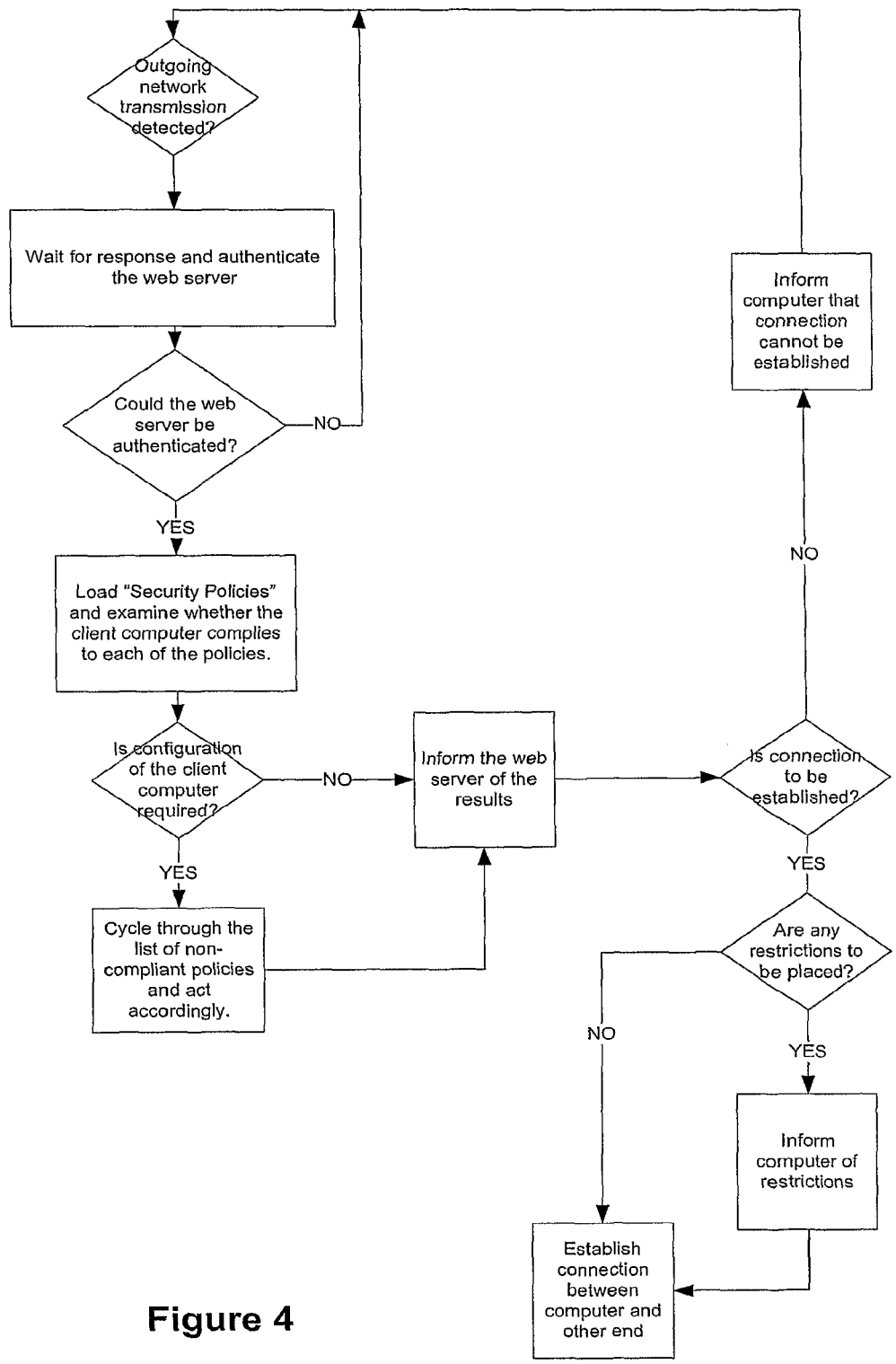
FIG. 4 is a flowchart illustrating the handshake process in FIG. 3.

As shown in FIG. 3 and FIG. 4, the client application 10 submits an evaluation of whether the client computer 20 adheres to the relevant security policies 85 of the web server 70 using an encrypted HTTPS post request. The evaluation is sent to the web server 70 so that the web server 70 can determine whether the communication should proceed, whether certain restriction on the communications or the activities being conducted need to be applied, or whether the client computer 20 needs to be configured in a manner complying with the security policies 85 of web server 70, such as, for example the initiation of lockdown mode.

Some examples of information that may be transmitted during this post request include the unique identifier of the client computer 20 along with details of whether or not:

the client antivirus engine is active
the client anti spyware engine is active
possibly malicious software/processes have been detected
known malicious software/processes 90 have been detected
these detections have been overridden by user 40
secure lockdown of the client computer 20 has been activated
the user 40 is able to override the security policies 85

The above values are appended to a HTTP post request which is included into the HTML code.

Quiet Mode

In one embodiment, a quiet mode is provided which allows the client application 10 to perform all the actions discussed above without any interaction from the user 40. Consequently, no pop-ups or any other user interactions dialogs are displayed when a particular security policy is enabled. It will be appreciated that in such a situation, the web service provider 80 will receive the status of the client computer 20 during the handshake process and from the user's 40 perspective, the notifications can be completely integrated into the online application or activity process.

Deployment

The client application 10 is an executable that can be deployed in either a self running executable mode which does not require installation on the client computer 20, or as a full installation in which the client application 10 is installed on the client computer 20 and automatically analyses all outgoing Internet transmissions.

The foregoing discussion is considered as illustrative only of the principles of the invention. Furthermore, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A method of establishing and regulating secure communications between a first computer and a second computer over a network, the first computer and the second computer being part of a system that regulates the security of the first computer during communications with the second computer, and where the second computer is a subscriber to the security system, the method comprising:

the first computer identifying whether the second computer is a subscriber to the security system;
on identifying that the second computer is a subscriber, the first computer:
 (i) supervising all outgoing data submissions; and
 (ii) referencing the security system to determine which security policies of the second computer apply for regulating communications with the second computer;
on receiving a connection from the first computer, the second computer depending on its requirements, initiating on the first computer a configuration process to secure the first computer in a lockdown mode;
the first computer communicating the results of the configuration process to the second computer;
on determining that communications should proceed, applying the applicable security policies of the second computer to the first computer; and regulating communications between the first computer and the second computer in accordance with the applied security policies.

2. The method of claim 1, wherein the lockdown mode includes the steps of:

comparing applications and/or processes running on the first computer with a list of approved applications and/or processes; and
stopping the applications and/or processes running on the first computer which do not appear on the list of approved applications and/or processes.

3. The method of claim 2, wherein the lockdown mode more particularly includes the first computer:

automatically checking all processes running on the first computer; and
referring to the security system having information relating to known and common processes;
allowing activity to proceed unless an unknown process is detected;
wherein if an unknown process is detected, the first computer:
 (i) warning a user of the first computer, or the second computer of such;
 (ii) giving the user of the first computer a choice to close the corresponding program or application of the unknown process or proceed without closing the corresponding program or application; and
 (iii) submitting the decision made by the user in relation to the choice to the second computer and depending on the security policies of the second computer, continuing or discontinuing with the secure communication, or having any restrictions to be placed on the activity conducted via the secure communications.

4. The method of claim 1, wherein on receiving a connection from the first computer, the second computer depending on its requirements, initiating an examination process on the first computer in order to obtain information relating to the configuration of the first computer to determine whether communications proceed, and the first computer communicating the results of the examination process to the second computer.

5. The method of claim 1, wherein the first computer identifying whether the second computer is a subscriber to the security system includes referencing a list of subscriber second computers provided by the security system, and wherein the referencing of the security system to determine security policies involves the first computer accessing a policy database storing various security policies for the sponsored second computers across the network; the method further including:

generating a computer readable mark up file to constitute a security policy of the second computer, the file comprising information including a universal resource locator, a digital certificate fingerprint, a Internet Protocol address, a name, and a description of the second computer, amongst other information;
signing the file using a cryptographic hash function to obtain a hash value for the file;
storing the file as a security policy in the policy database for the second computer; and
sending the hash value over the network to a separate update server hosted in a secure environment.

6. The method of claim 5, further including during the examination process, the first computer: calculating the hash values of the security policies of the second computer, retrieving the stored hash values of the security policies from the separate update server, and comparing the calculated and retrieved hash values to verify the authenticity of the security policies.

7. The method of claim 5, further including during the examination process, notifying the user or the second computer, or both if the configuration of the first computer does not comply with the security policies of the second computer, but does not configure the first computer or restrict activities of the user.

8. A non-transitory computer readable medium comprising computer instruction code that when executed by a computer establishes and regulates secure communications between a first computer and a second computer over a network, and causes the computer to execute tasks, the first computer and the second computer being part of a security system that regulates the security of the first computer during communications with the second computer, where the second computer is a subscriber to the security system, the tasks including:
the first computer identifying whether the second computer is a subscriber to the security system by reference to a list of subscriber second computers provided by the security system;
on identifying the second computer is a subscriber, the first computer:
(i) supervising all outgoing data submissions; and
(ii) referencing the security system to determine which security policies apply for regulating communications with the second computer;
on receiving a connection from the first computer, the second computer depending on its requirements, initiating a configuration process on the first computer to secure the first computer in a lockdown mode;
the first computer communicating the results of the configuration process to the second computer;
on determining that communications should proceed, applying the applicable security policies of the second computer to the first computer; and
regulating communications between the first computer and the second computer in accordance with the applied security policies.

9. The computer readable medium as claimed in claim 8, wherein the lockdown mode includes the steps of:
comparing applications and/or processes running on the first computer with a list of approved applications and/or processes; and
stopping the applications and/or processes running on the first computer which do not appear on the list of approved applications and/or processes.

10. The computer readable medium as claimed in claim 9, wherein the lockdown mode more particularly includes the first computer:
automatically checking all processes running on the first computer; and
referring to the security system having information relating to known and common processes;
allowing activity to proceed unless an unknown process is detected;
wherein if an unknown process is detected, the first computer:
(i) warning a user of the first computer, or the second computer of such;
(ii) giving the user of the first computer a choice to close the corresponding program or application of the unknown process or proceed without closing the corresponding program or application; and
(iii) submitting the decision made by the user in relation to the choice to the second computer and depending on the security policies of the second computer, continuing or discontinuing with the secure communication, or having any restrictions to be placed on the activity conducted via the secure communications.

11. A system for establishing and regulating the security of a first computer during communication with a second computer over a network, comprising:
a security system resident on at least a memory of a remote computer where the second computer is a subscriber to the security system, and
a computer application for running on the first computer to identify whether the second computer is a subscriber to the security system by reference to a list of subscriber second computers provided by the security system;
the computer application including functions to:
(i) supervise all outgoing data submissions; and
(ii) reference the security system to determine which security policies relating to the second computer apply for regulating communications with the second computer;
said functions being adapted to be invoked on the computer application identifying that the second computer is a subscriber; and
the computer application including a configuration process on the first computer to secure the first computer in a lockdown mode;
said configuration process being adapted to be initiated by the second computer on receiving a connection from the first computer, depending on the requirements of the second computer;
the computer application further including functions to:
(i) communicate the results of the configuration process to the second computer;
(ii) apply the applicable security policies of the second computer to the first computer on determining that communications should proceed; and
(iii) regulate communications between the first computer and second computer in accordance with the applied security policies.

12. The system as claimed in claim 11, further including:
a security policy provider associated with the security system having a policy database for storing the security policies of subscriber second computers.

13. The system as claimed in claim 12, wherein the computer application for lockdown mode includes functions to:
(i) compare applications and/or processes running the first computer with a list of approved applications and/or processes; and
(ii) stop the applications and/or processes running on the first computer which do not appear on the list of approved applications and/or processes.

14. The system as claimed in claim 13, wherein the computer application for lockdown mode further includes functions to:
(i) automatically check all processes that are running on the first computer;
(ii) refer to the security system to obtain information relating to known and common processes;
(iii) allow activity to proceed on the first computer unless an unknown process is detected;
(iv) warn a user of the first computer or the second computer when an unknown process is detected;
(v) close the corresponding program or application of the unknown process or proceed without closing the corresponding program or application in response to a user instruction to do so;
(vi) advise the second computer of the decision made by the user in response to (v);
(vii) continue or discontinue with the secure communication, or restrict activity conducted via the secure communications in accordance with the security policies of the second computer in view of (v).

15. The system as claimed in claim 11, wherein the computer application includes an examination process on the first computer to obtain information relating to the configuration of the first computer to determine whether communications proceed or restrictions to communications should apply; said examination process being adapted to be initiated by the second computer on receiving a connection from the first computer, depending on the requirements of the second computer; and
the computer application further including a function to communicate the results of the examination process to the second computer.

16. The system as claimed in claim 11, further including an identifier provider associated with the security system for providing a list of subscriber second computers;
and wherein the computer application includes a function to store the information locally for subsequent access to facilitate comparing and authenticating the second computer; and
the security system includes computer readable markup files to comprise the security policies of the second computer, the file comprising information including the universal resource locator, the digital certificate fingerprint, the Internet Protocol address, the name, and the description of the second computer, amongst other information; and hash values for each of the computer readable markup files; the files being stored as security policies in the policy database and the hash values being stored in a separate update server hosted in a secure environment.

* * * * *